(12) United States Patent
Sepasi et al.

(10) Patent No.: US 11,926,132 B2
(45) Date of Patent: Mar. 12, 2024

(54) NATURAL FIBER COMPOSITE SANDWICH PANEL

(71) Applicant: ABC TECHNOLOGIES INC., Toronto (CA)

(72) Inventors: Mosen Sepasi, Mississauga (CA); Aram Khosh Ettekal, Toronto (CA)

(73) Assignee: ABC TECHNOLOGIES INC. (CA)

( * ) Notice: Subject to any disclaimer, the term of this patent is extended or adjusted under 35 U.S.C. 154(b) by 343 days.

(21) Appl. No.: 17/096,051

(22) Filed: Nov. 12, 2020

(65) Prior Publication Data

US 2021/0138760 A1    May 13, 2021

Related U.S. Application Data

(60) Provisional application No. 62/934,804, filed on Nov. 13, 2019.

(51) Int. Cl.
| | | |
|---|---|---|
| *B32B 3/10* | (2006.01) | |
| *B32B 3/30* | (2006.01) | |
| *B32B 5/02* | (2006.01) | |
| *B32B 27/12* | (2006.01) | |
| *B60R 13/02* | (2006.01) | |

(52) U.S. Cl.
CPC ............. *B32B 3/30* (2013.01); *B32B 5/022* (2013.01); *B32B 27/12* (2013.01); *B60R 13/02* (2013.01); *B32B 2262/106* (2013.01); *B32B 2451/00* (2013.01); *B32B 2605/003* (2013.01)

(58) Field of Classification Search
None
See application file for complete search history.

(56) References Cited

U.S. PATENT DOCUMENTS

| 4,243,456 A | 1/1981 | Cesano |
| 4,818,462 A | 4/1989 | Murano |

(Continued)

FOREIGN PATENT DOCUMENTS

| DE | 102004054228 A1 | 6/2006 |
| JP | 2021172038 A * | 11/2021 |

(Continued)

OTHER PUBLICATIONS

Machine translation of JP-2021172038-A (Year: 2021).*

*Primary Examiner* — Christopher M Polley
(74) *Attorney, Agent, or Firm* — McDonald Hopkins LLC

(57) ABSTRACT

Provided is a composite sandwich panel. The composite sandwich panel includes a core, a first thermoplastic layer applied to a first side of the core, and a second thermoplastic layer applied to a second side of the core. The core is provided in the form of a wave board formed from natural fiber. Also provided is a process for manufacturing a composite sandwich panel. The process comprises extruding a first and second thermoplastic layer into respective flat sheets, forming a consolidated natural fibrous mat, and molding the consolidated natural fibrous mat into a consolidated core having a predetermined geometry. The first and second thermoplastic layers, as well as the consolidated core are heated to a predetermined molding temperature. The heated consolidated core is placed between the heated first and second thermoplastic layers, and the assembly is molded in a molding press into a desired shape determined by product design intent.

18 Claims, 5 Drawing Sheets

(56) References Cited

U.S. PATENT DOCUMENTS

| | | |
|---|---|---|
| 7,163,253 B2 | 1/2007 | Montagna et al. |
| 7,316,444 B2 | 1/2008 | Montagna et al. |
| 2002/0106952 A1 | 8/2002 | Hashizume et al. |
| 2006/0105661 A1 | 5/2006 | Steinbach |
| 2008/0211137 A1 | 9/2008 | Schilles |
| 2009/0136708 A1 | 5/2009 | Huang et al. |
| 2009/0297758 A1* | 12/2009 | de Groot .................. B32B 5/18 |
| | | 156/227 |
| 2012/0164367 A1* | 6/2012 | Delmas .................... B32B 3/12 |
| | | 428/116 |
| 2013/0052412 A1 | 2/2013 | Fox et al. |
| 2015/0132532 A1 | 5/2015 | Preisler |
| 2015/0266260 A1 | 9/2015 | Fujioka et al. |
| 2016/0361889 A1 | 12/2016 | Bartolome |
| 2017/0151707 A1 | 6/2017 | Iwano |
| 2018/0345570 A1 | 12/2018 | Sepasi |
| 2020/0031088 A1 | 1/2020 | Li et al. |

FOREIGN PATENT DOCUMENTS

| | | | |
|---|---|---|---|
| WO | 2010082970 A2 | 7/2010 | |
| WO | WO-2013158182 A3 * | 1/2014 | ............ B32B 37/02 |
| WO | 2018117971 A1 | 6/2018 | |

* cited by examiner

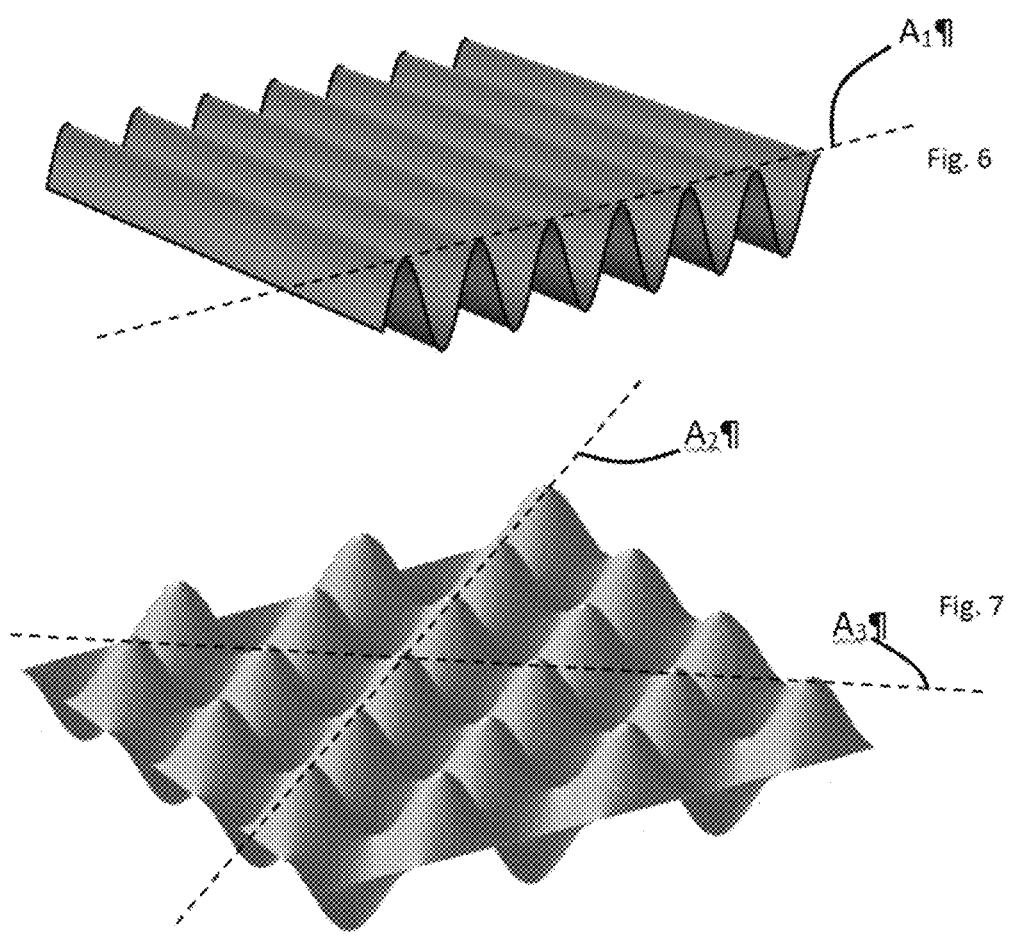

NATURAL FIBER COMPOSITE SANDWICH PANEL

FIELD OF THE INVENTION

The present invention generally relates to the field of automotive interior panels, and in particular to an automotive composite sandwich panel incorporating a natural fiber core.

BACKGROUND OF THE INVENTION

Automotive interior trim panels such as instrument panels, door panels, as well as those found on pillars, in the rear cargo area, and a variety of other interior surfaces have traditionally served to enhance the interior aesthetics of the vehicle. The automotive industry is quickly evolving, and the refinement of the automotive interior environment is an ever growing indicator of overall quality that consumers are increasingly attuned to. As such, there is a continual drive to elevate the quality of the interior environment, in particular as automobiles are increasingly being viewed as an extension of living space. This is especially important as the industry moves towards autonomous vehicles, as the perception of the vehicle interior will gradually shift away from one of utility, to one of recreation and relaxation.

Interior trim parts have traditionally been formed through various injection molding, thermoforming and compression molding processes. While these processes used in the customary manner have been effective in producing high quality parts, there is now in the industry a focus on fuel economy and general overall light-weighting. While these traditional manufacturing processes will still find application, they will be need to be applied in a way that achieves a more modern interior trim component, one that is constructed of modern materials and having a structure that offers a lightened product, without loss of performance or structural integrity.

Accordingly, there is a need in the industry for constructions that are lighter in weight, yet achieve the expected performance criteria.

SUMMARY OF THE INVENTION

According to an aspect of an embodiment, provided is a composite sandwich panel. The composite sandwich panel includes a core, a first thermoplastic layer applied to a first side of the core, and a second thermoplastic layer applied to a second side of the core. The core is provided in the form of a wave board formed from natural fiber.

According to another aspect of an embodiment, provided is a process for manufacturing a composite sandwich panel. The process comprises extruding a first and second thermoplastic layer into respective flat sheets, forming a consolidated natural fibrous mat, and molding the consolidated natural fibrous mat into a consolidated core having a predetermined geometry. The first and second thermoplastic layers are then heated to a predetermined temperature characterised by the specific resin and filler requirements, while the consolidated core is also heated to a predetermined temperature. The heated consolidated core is placed between the heated first and second thermoplastic layers, and the assembly is molded in a molding press into a desired shape determined by product design intent.

BRIEF DESCRIPTION OF THE DRAWINGS

The foregoing and other features and advantages of the invention will be apparent from the following description of the invention as illustrated in the accompanying drawings. The accompanying drawings, which are incorporated herein and form a part of the specification, further serve to explain the principles of the invention and to enable a person skilled in the pertinent art to make and use the invention. The drawings are not to scale.

FIG. 6 illustrates a composite sandwich panel having a waveform formed as a repeating pattern along a single axis.

FIG. 7 illustrates a composite sandwich panel having a waveform formed as a repeating pattern along two axes.

DETAILED DESCRIPTION OF EMBODIMENTS

Specific embodiments of the present invention will now be described with reference to the Figures, wherein like reference numbers indicate identical or functionally similar elements. The following detailed description is merely exemplary in nature and is not intended to limit the invention or the application and uses of the invention. A person skilled in the relevant art will recognize that other configurations and arrangements can be used without departing from the scope of the invention. Although the description and drawings of the embodiments hereof exemplify the technology as applied to automotive load floors, the invention may be applied in other automotive applications. The technology may also find application outside the automotive field, for example in the aerospace sector. Furthermore, there is no intention to be bound by any expressed or implied theory presented in the preceding technical field, brief summary or the following detailed description.

The Composite Panel

Figure 1:
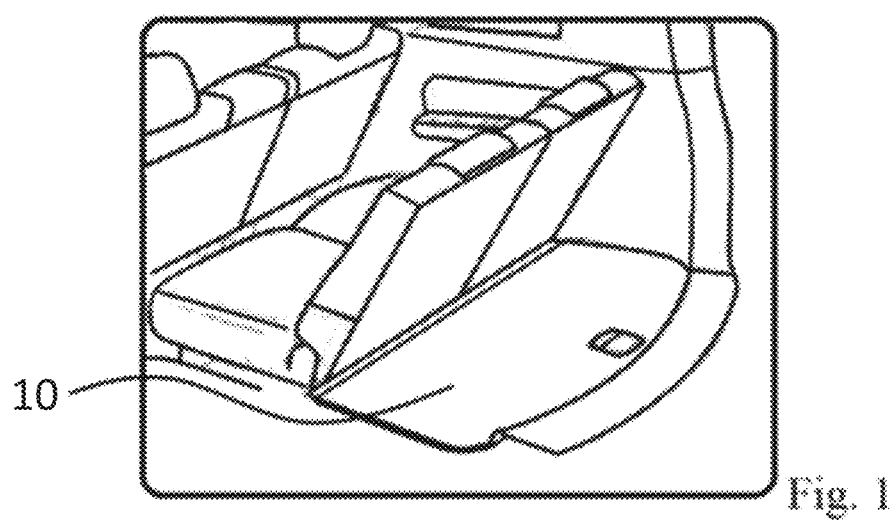
FIG. 1 is a partial perspective view of an interior of an automobile, showing the composite sandwich panel arranged in the form of a load floor.

Turning now to FIG. 1, shown is an exemplary composite sandwich panel arranged in the form of an automotive load floor. It will be appreciated that the composite sandwich panel may be used in a variety of automotive applications, including but not limited to spare tire covers, rear package shelves, rear package trays, rear seat backs, and rear garnish trim inserts on sport-utility and crossover-type vehicles.

Figure 2:
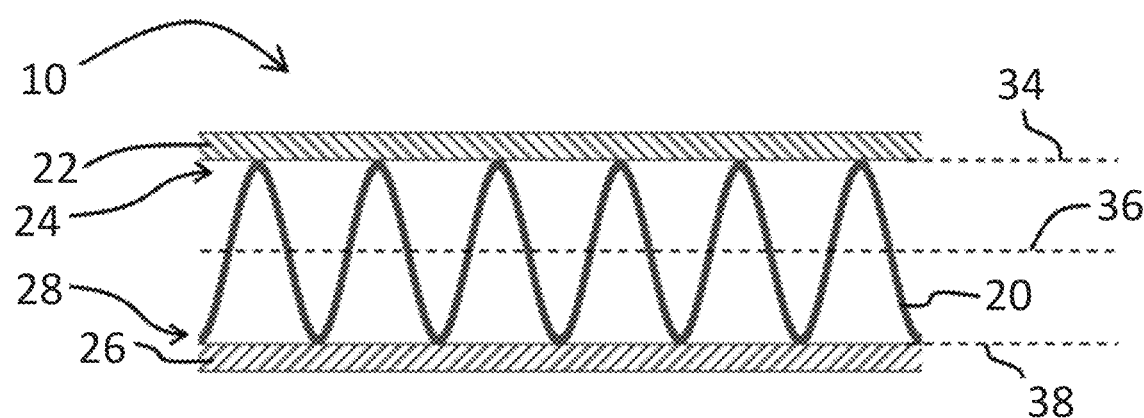
FIG. 2 is a partial sectional view of the composite sandwich panel, where the waveform of the core is formed as a repeating sinusoidal wave.

Shown schematically in FIG. 2 is a cross-sectional profile of the composite sandwich panel 10. The panel 10 includes a core 20, a first thermoplastic layer 22 applied to a first side 24 of the core 20, and a second thermoplastic layer 26 applied to a second side 28 of the core 20.

The Core

Figure 3:
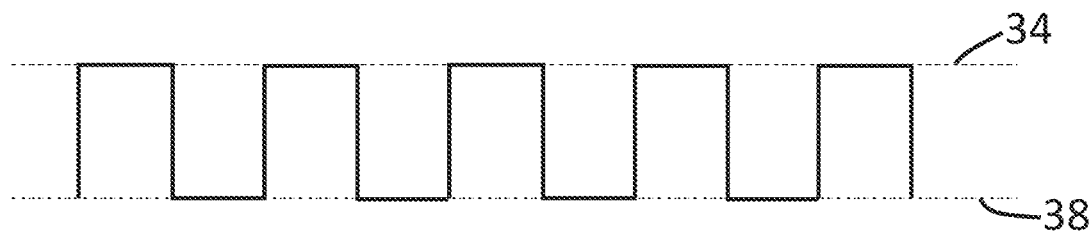
FIG. 3 is a schematic representation of an alterative waveform design for the core, the waveform formed as a repeating square wave.
Figure 4:
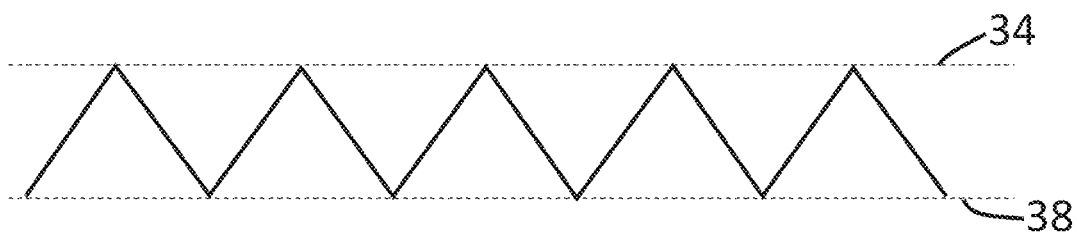
FIG. 4 is a schematic representation of an alterative waveform design for the core, the waveform formed as a repeating triangular wave.
Figure 5:
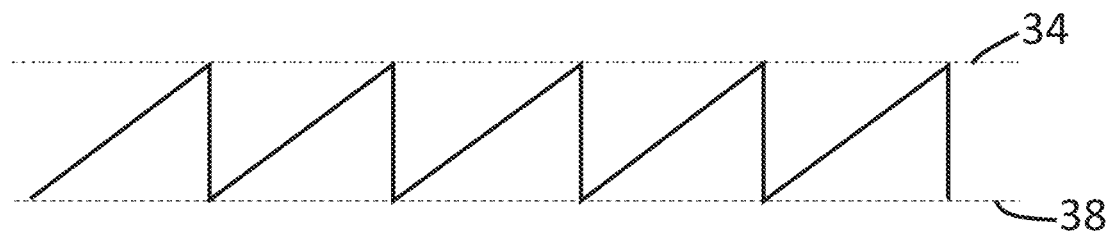
FIG. 5 is a schematic representation of an alterative waveform design for the core, the waveform formed as a repeating sawtooth wave.

For the composite sandwich panel shown in FIG. 2, the core 20 is a provided in the form of a wave board formed from natural fiber. The wave board is characterized by a regular repeating waveform pattern that extends from a first plane 34, across a central plane 36 to a second plane 38. For example, the regular repeating pattern could be a sinusoidal pattern, as shown in FIG. 2. The pattern may also be configured as a square wave (see FIG. 3), a triangular wave (see FIG. 4) or a sawtooth wave (see FIG. 5).

It will be appreciated that variants of these regular repeating patterns may also be used. For example, while the repeating pattern may be arranged to repeat along a single axis ($A_1$; as shown in FIG. 6), the repeating pattern may be configured to repeat along two axes ($A_2$, $A_3$; as shown in FIG. 7).

The core 20 constructed in this way may have a thickness ranging from 10 to 25 mm, measured from the first plane 34 to the second plane 38. Specific thicknesses contemplated include 10, 15, 20, and 25 mm. It will be appreciated that thicknesses both above and below this range, as well as between the specific values noted above may also be suitably implemented. The repeating pattern may be constructed to establish a repeating pattern every 5 to 30 mm. Stated differently, the distance representing one cycle of the repeating pattern may be established to be 5 to 30 mm. Specific distances contemplated (for one cycle) include 5, 10, 15, 20, 25, and 30 mm. It will be appreciated that cycle distances both above and below this range, as well as between the specific values noted above may also be suitably implemented. The natural fiber used to construct the core may have a density ranging from 600 $g/m^2$ to 1700 $g/m^2$. Specific densities contemplated include 600, 700, 800, 900, 1000, 1100, 1200, 1300, 1400, 1500, 1600, 1700 $g/m^2$. It will be appreciated that densities both above and below this range, as well as between the specific values noted above may also be suitably implemented.

The core 20 is prepared from a natural fibrous mat through a consolidation process. In the consolidation process, the natural fibrous mat is impregnated with a bonding agent and subjected to heat and pressure (i.e. through a series of heated compression rollers or a mold press), to sufficiently soften the bonding agent, enabling it to wet out and fully capsulate the natural fibrous mat. The softened and wetted natural fibrous mat is then molded in a mold press to the desired three-dimensional configuration (i.e. single axis sinusoidal repeating pattern). For the consolidation process, a bonding agent for impregnating the natural fibrous mat includes polypropylene or polyethylene, although other suitable bonding agents may be implemented.

The natural fibrous mat may include a range of natural fibers including but not limited to kenaf, hemp, flax, coconut (coir), sisal, jute, and mixtures thereof. In some embodiments, the natural fibrous mat may be supplemented/blended with a secondary fibrous material, such as glass fiber and/or carbon fiber. The carbon fiber content may be sourced as a recycled carbon fiber, for example chopped reclaimed carbon fiber. Other synthetic fibers that may be used for the secondary fibrous material include, but are not limited to polymeric fibers (i.e. Kevlar or aramid fibers), and mineral fibers, and mixtures thereof.

The natural fibrous mat may be provided in a variety of forms, including but not limited to woven and non-woven mats. In some embodiments, the natural fibrous mat is a non-woven mat, for example as produced through a needle punch process. It will be appreciated, however, that a variety of manufacturing methods for both non-woven and woven mats are known, and will not be detailed herein. In general, the natural fibrous mat will include the natural fiber and any secondary material in a uniformly dispersed arrangement within the mat, thereby exhibiting consistency with respect to both performance characteristics and matrix wetting during consolidation to form the core.

First and Second Thermoplastic Layers

The first and second thermoplastic layers 22, 26 may be formed in a number of ways. In a first embodiment, the layers 22, 26 may be formed using a sheet extrusion process. In an alternative embodiment, the layers 22, 26 may be formed using a fibrous mat that is consolidated into a generally planar construct.

Sheet Extrusion

As mentioned above, the layers 22, 26 may be formed of a thermoplastic resin using a sheet extrusion process. Exemplary thermoplastic resins include, but are not limited to polypropylene, Nylon or polyethylene. The thermoplastic resin may be sourced as either a virgin or recycled material. The thermoplastic resin may additionally contain a filler material to achieve a desired performance and/or aesthetic characteristic. The filler material may be selected from a range of natural, inorganic, and synthetic materials, and may be sourced as either a virgin or recycled material. Exemplary natural materials include a range of natural fibers, including but not limited to kenaf, hemp, flax, coconut (coir), sisal, jute, and mixtures thereof. Exemplary inorganic filler materials include, but are not limited to mica, calcium carbonate, talc, and mixtures thereof. Synthetic materials may include, but are not limited to glass fiber, carbon fiber, and mixtures thereof. In one exemplary embodiment, the layers are extruded from polypropylene, and include a glass fiber additive.

Consolidated Fibrous Mat

As previously mentioned, the layers 22, 26 may also be molded using a fibrous mat that is impregnated and consolidated into a planar construct using a suitable plastic matrix. The fibrous mat may be selected from a range of materials. In a first embodiment, the fibrous mat is formed from virgin or recycled carbon fiber, or a combination thereof. In another embodiment, the fibrous mat may be formed from natural fiber. In a further embodiment, the fibrous mat may be formed from glass fiber. In yet another embodiment, the fibrous mat is a blended mat that includes two or more of natural fiber, virgin or recycled carbon fiber, and glass fiber. Natural fibers may be selected from a range of natural fibers including but not limited to kenaf, hemp, flax, coconut (coir), sisal, jute, and mixtures thereof. Both virgin and recycled carbon fiber are available commercially. Where the fibrous mat is formed from a blended recycled carbon fiber/natural fiber, the amount of recycled carbon fiber in the blended mat may range from 5% to 70% (w/w RCF to NF), with specific quantities contemplated including 5%, 7%, 15%, 17% 25%, 35%, 50%, 60%, 70%, (w/w). It will be appreciated that quantities of recycled carbon fiber both above and below this range, as well as between the specific values noted above may also be suitably implemented. Where the fibrous mat is formed from a blended glass fiber/natural fiber, the amount of glass fiber in the blended mat may range from 5% to 70% (w/w GF to NF), with specific quantities contemplated including 5%, 7%, 15%, 17% 25%, 35%, 50%, 60%, 70% (w/w). It will be appreciated that quantities of glass fiber both above and below this range, as well as between the specific values noted above may also be suitably implemented.

In some embodiments, a synthetic fiber may be substituted for the natural fiber component in the blended mat. In other embodiments, the synthetic fiber may constitute a third component in the natural fiber/recycled carbon fiber or natural fiber/glass fiber blended mat. Suitable synthetic fibers may include, but are not limited to polymeric fibers (i.e. Kevlar or aramid fibers), mineral fibers, glass fibers or mixtures thereof.

The fibrous mat may be provided in a variety of forms, including but not limited to a woven and non-woven mat. In a preferred embodiment, the fibrous mat is a non-woven mat, for example as produced through a wetlaid process. It will be appreciated, however, that a variety of manufacturing methods for both non-woven and woven mats are known, and will not be detailed herein. In general, the fibrous mat includes fibrous content, for example the natural fiber and recycled carbon fiber in a uniformly dispersed arrangement within the mat, thereby exhibiting consistency with respect to both performance characteristics and matrix wetting during manufacture of the composite panel.

There are various ways in which the plastic impregnated fibrous mat may be molded into the desired generally planar layers. For instance, the fibrous mat may be incorporated into molding processes including, but not limited to thermoform molding, thermoset molding, autoclave molding, casting, and stamping.

The plastic matrix may be selected from both thermoset and thermoplastic polymers. In a preferred embodiment, the matrix is a thermoplastic, such as polypropylene. Other embodiments may use a thermoset resin for the plastic matrix, in particular polyurethane. The polyurethane may be formulated in a variety of ways as generally known in the art to produce a rigid or semi-rigid matrix once cured. The polyol component of the polyurethane may be derived from petroleum or bio-based sources, or may consist of a combination thereof.

Alternatives

Additional molding process methodologies may be implemented, depending on the desired panel product. For example, the layers may be formed using an injection molding process, a blow molding process, or any other suitable molding process methodology suitable for achieving the desired shape and form of the layers being manufactured.

Decorative Layers

Figure 8:
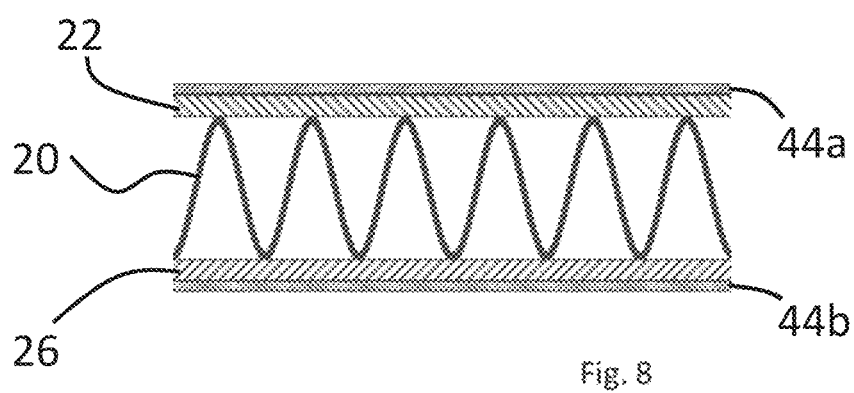
FIG. 8 illustrates the composite sandwich panel of FIG. 2, with the addition of a decorative layer on the upper and lower surfaces.

In some embodiments one or both of the layers 22, 26 may include an additional covering/decorative layer on an external surface thereof (see FIG. 8). For the first thermoplastic layer 22, in particular when the first thermoplastic layer 22 includes as an upper external layer of the natural fiber composite sandwich panel, the covering/decorative layer 44a may include, but is not limited to, carpet, fabric, natural or artificial leather, scrim, or painted film. For the second thermoplastic layer 26, in particular when the second thermoplastic layer is provided as a lower external layer of the natural fiber composite sandwich panel, the covering/decorative layer 44b may include, but is not limited to rubber, scrim, or a soft thermoplastic skin.

Process of Manufacture

Figure 9:
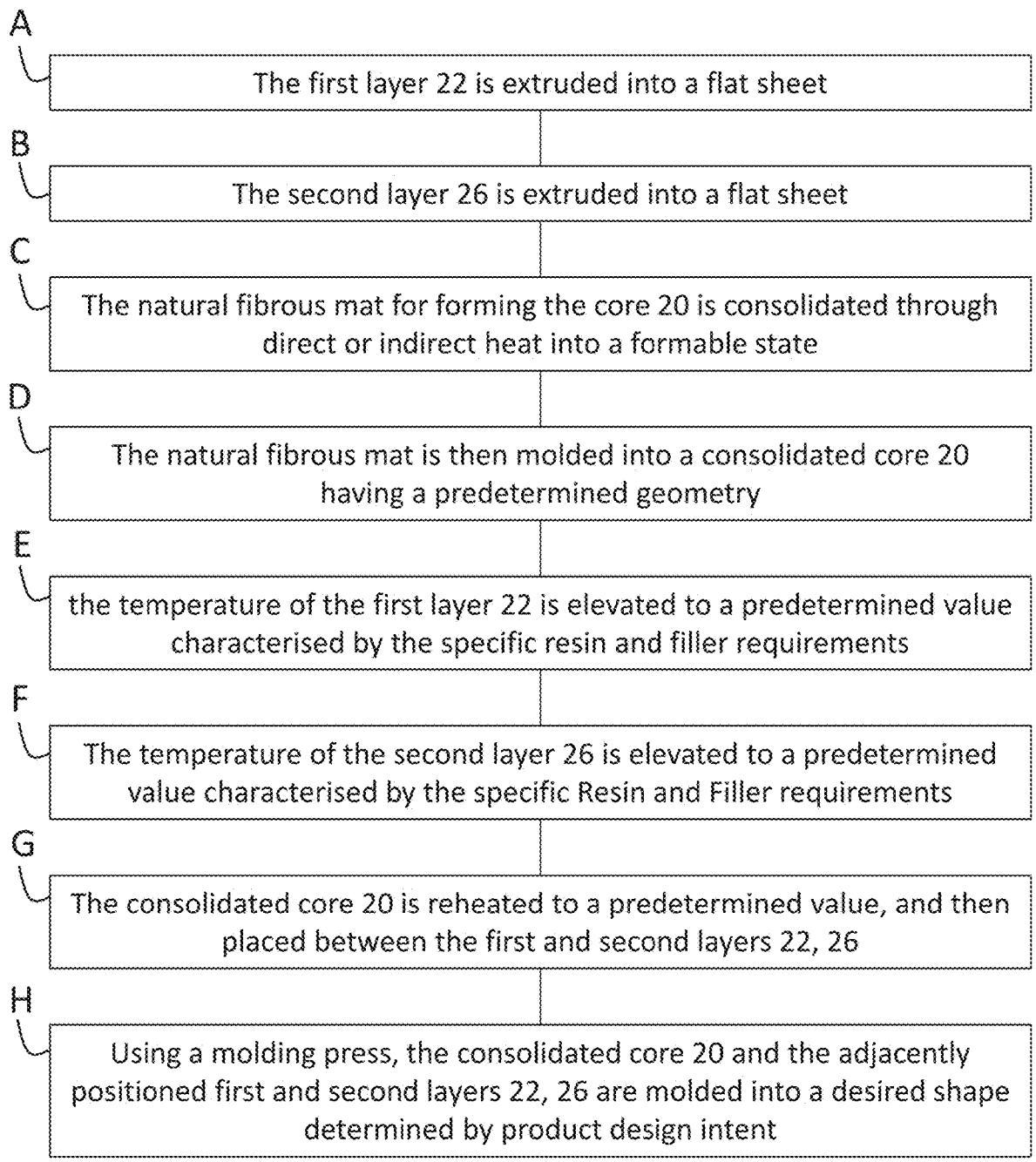
FIG. 9 is a process flow diagram for manufacturing the composite sandwich panel.

Turning now to FIG. 9 shown is a molding process suitable for forming the aforementioned composite sandwich panel 10. The process generally proceeds as follows:

STEP 1 (at A, FIG. 9)—The first layer 22 is extruded into a flat sheet with predetermined size and density which may or may not include a decorative or functional layer;

STEP 2 (at B, FIG. 9)—The second layer 26 is extruded into a flat sheet with predetermined size and density which may or may not include a decorative or functional layer;

STEP 3 (at C, FIG. 9)—The natural fibrous mat for forming the core 20 is consolidated through direct or indirect heat into a formable state;

STEP 4 (at D, FIG. 9)—The natural fibrous mat is then molded into a consolidated core 20 having a predetermined geometry;

STEP 5 (at E, FIG. 9)—In a secondary operation, the temperature of the first layer 22 is elevated to a predetermined value characterised by the specific resin and filler requirements;

STEP 6 (at F, FIG. 9)—Similar to the first layer 22, the temperature of the second layer 26 is elevated to a predetermined value characterised by the specific Resin and Filler requirements;

STEP 7 (at G, FIG. 9)—The consolidated core 20 is reheated to a predetermined value, and then placed between the first and second layers 22, 26;

STEP 8 (at H, FIG. 9)—Using a molding press, the consolidated core 20 and the adjacently positioned first and second layers 22, 26 are molded into a desired shape determined by product design intent;

Although the invention has been exemplified as applied to an automotive load floor, which is generally a planar construct, the product and process of manufacture may also find application in the formation of other panels having a three-dimensional (i.e. non-planar) configuration, such as interior trim panels.

While various embodiments according to the present invention have been described above, it should be understood that they have been presented by way of illustration and example only, and not limitation. It will be apparent to persons skilled in the relevant art that various changes in form and detail can be made therein without departing from the scope of the invention. Thus, the breadth and scope of the present invention should not be limited by any of the above-described exemplary embodiments, but should be defined only in accordance with the appended claims and their equivalents. It will also be understood that each feature of each embodiment discussed herein, and of each reference cited herein, can be used in combination with the features of any other combination. All patents and publications discussed herein are incorporated by reference herein in their entirety.

What is claimed is:

1. A composite sandwich panel comprising:
   a core;
   a first thermoplastic layer applied to a first side of the core; and
   a second thermoplastic layer applied to a second side of the core,
   wherein the core is a provided in the form of a wave board formed from natural fiber, and
   wherein the wave board is a three-dimensional sheet having a regular repeating waveform pattern along at least one axis, the regular repeating waveform pattern including a plurality of peaks and a plurality of valleys, the valleys opposing the peaks, wherein the peaks are disposed adjacent to the first thermoplastic layer and the valleys are disposed adjacent to the second thermoplastic layer, and
   wherein the three-dimensional sheet is a continuous structure.

2. The composite sandwich panel according to claim 1, wherein the wave board is characterized by the regular repeating waveform pattern that extends from a first plane, across a central plane to a second plane.

3. The composite sandwich panel according to claim 2, wherein the regular repeating waveform pattern is a sinusoidal pattern.

4. The composite sandwich panel according to claim 2, wherein the regular repeating waveform pattern is a square-wave pattern.

5. The composite sandwich panel according to claim 2, wherein the regular repeating waveform pattern is a triangular wave pattern.

6. The composite sandwich panel according to claim 2, wherein the regular repeating waveform pattern is a sawtooth wave pattern.

7. The composite sandwich panel according to claim 2, wherein the at least one axis is a single axis.

8. The composite sandwich panel according to claim 2, wherein the at least one axis is two axes.

9. The composite sandwich panel according to claim 1, wherein the natural fiber is blended with a secondary fibrous material.

10. The composite sandwich panel according to claim 9, wherein the secondary fibrous material is a carbon fiber.

11. The composite sandwich panel according to claim 1, wherein the natural fiber is provided in the form of a non-woven mat.

12. The composite sandwich panel according to claim 1, wherein at least one of the first and second thermoplastic layers is formed of a thermoplastic resin in a sheet extrusion process.

13. The composite sandwich panel according to claim 1, wherein at least one of the first and second thermoplastic layers is formed of a fibrous mat that is impregnated and consolidated using a suitable plastic matrix.

14. The composite sandwich panel according to claim 13, wherein the plastic matrix is a thermoset or thermoplastic polymer.

15. The composite sandwich panel according to claim 1, wherein one or both of the first and second thermoplastic layers additionally include a covering or decorative layer.

16. The composite sandwich panel according to claim 15, wherein the covering or decorative layer is selected from the group consisting of carpet, fabric, leather, scrim, painted film, rubber, and a soft thermoplastic skin.

17. The composite sandwich panel according to claim 1, wherein the panel is provided in the form of an automotive load floor.

18. The composite sandwich panel according to claim 1, wherein the panel is provided in the form of an automotive interior trim panel.

\* \* \* \* \*